United States Patent

Ray et al.

[11] Patent Number: 6,095,289
[45] Date of Patent: Aug. 1, 2000

[54] APPARATUS AND METHOD OF THERMALLY DETECTING ELEVATOR MACHINE BRAKE

[75] Inventors: Sib S. Ray, Newington; August J. Dobler, West Simsbury, both of Conn.

[73] Assignee: Otis Elevator Company, Farmington, Conn.

[21] Appl. No.: 08/996,943

[22] Filed: Dec. 23, 1997

[51] Int. Cl.[7] .................................................. F16D 66/00
[52] U.S. Cl. .............................. 188/1.11 E; 188/1.11 R
[58] Field of Search .......................... 188/1.11 E, 1.11 R, 188/1.11 L, 1.11 W, 171, 156, 1.06 P, 181 A, 181 R, 75, 76, 68, 71.6, 71.7; 303/122.03, 191, 199

[56] References Cited

U.S. PATENT DOCUMENTS

| | | | |
|---|---|---|---|
| 4,674,326 | 6/1987 | Reinecke | 73/129 |
| 5,060,890 | 10/1991 | Utterback et al. | 246/169 A |
| 5,149,025 | 9/1992 | Utterback et al. | 246/169 A |
| 5,419,415 | 5/1995 | Lamb et al. | 188/1.11 L |
| 5,651,431 | 7/1997 | Kyrtsos | 188/1.11 L |
| 5,742,920 | 4/1998 | Cannuscio et al. | 701/102 |

*Primary Examiner*—Robert J. Oberleitner
*Assistant Examiner*—Mariano Sy

[57] ABSTRACT

An apparatus and method are provided for detecting brake drag of an elevator machine brake (30). Temperature sensors (44) are disposed in close proximity to a pair of brake pads (35,36) and compared to ambient temperature to determine whether the brake pads are dragging on a rotating brake drum (37). A comparison circuit (47) is used to determine if the temperature of the brake pads has exceeded a predetermined threshold level (55) and to produce an output signal (52) corresponding to the position of the brake pads.

2 Claims, 3 Drawing Sheets

APPARATUS AND METHOD OF THERMALLY DETECTING ELEVATOR MACHINE BRAKE

TECHNICAL FIELD

This invention relates to an elevator monitoring device and method. More specifically, this invention relates to a device which monitors elevator machine brake temperatures to determine brake drag and provides an electronic signal corresponding thereto.

BACKGROUND ART

The use of electromagnetic elevator machine brakes is well known in the art. Referring to prior art FIG. 1 such a typical electromagnetic brake is shown generally as 1 having a pair of brake pads 6, 7 attached to levers 2, 3 which are biased into contact with brake drum 8 by a pair of springs 20, 21 to produce sufficient force to hold an elevator car (not shown). In operation, an electromagnetic brake coil 9 lifts brake pads 6, 7 away from drum 8 and thereby releasing the elevator car. A mechanical switch 19 produces a signal corresponding to the position of the brake pads 6, 7, either in the braking position against brake drum 8 or in the lifted position away from brake drum 8. A pair of adjustment screws 22, 23 is further provided within sensing arms 13, 14 to permit adjustment of mechanical switch 19 to allow for wear of the brake pads and other moving and rotating parts.

It is important to monitor the position of the brake pads to ensure that the pads are lifted from the drum prior to the start of motion of the car. If the pads are left in contact with the drum while the elevator car is moving they will wear excessively and require more frequent maintenance. In addition, if the brake drum and pads are heated excessively the electromagnetic brake will lose its effectiveness in braking the elevator car.

The switch system of the prior art as described hereinabove has several drawbacks. The electromechanical switch is actuated every time the elevator car moves subjecting all the moving parts, including the electrical contacts, to deteriorate through wear and tear. Because of the wear and tear the electromechanical switch can go out of adjustment and can cause both false positive signals and false negative signals. If the switch produces a false negative signal, one that indicates that the pads are dragging while the car is moving while they are in fact not contacting the drum, a perfectly normally operating elevator will be shut down for a maintenance action. If the switch produces a false positive, one that indicates that the brake pads have lifted off the drum when in fact they maintain contact with the drum while the car is moving, then the pads will wear and cause excessive heat and reduced braking effectiveness.

Another attempt to monitor elevator brakes is disclosed in U.S. Pat. No. 5,419,415 ('415) wherein a sensor is imbedded within a carrier disposed in the brake pad. The sensor monitors brake pad wear and through a monitoring circuit detects brake lining failures. The sensor in the '415 patent can also be a temperature dependent resistor wherein a temperature within the brake lining can be determined. The system described in '415 has several drawbacks, one being that the integrity of the brake lining is compromised by the placement of the carrier/sensor within the lining itself. The compromise in the structural integrity of the lining may lead to premature failure of the lining and severally degrade brake performance leading to further brake maintenance actions. In addition, the sensor described in the '415 patent requires complicated control circuitry to interpret the change in resistance and correlate it to an increase in temperature. It is also important to note that the circuit disclosed is fairly complex and requires a number of offset voltage sources and reference resistors. Another problem in thermally detecting brake drag in an elevator machine brake is that the ambient temperature within the elevator room may have as high as a 35 degree Celsius deviation within a single day. The '415 patent discloses a temperature sensing circuit which does not monitor ambient conditions and may produce a false signal indicating a brake drag condition simply due to an increase in ambient temperature. In addition the '415 patent teaches the use of a temperature dependant resistant as a sensor which may not provide a rapid enough indication of an actual brake drag condition.

The brake drag monitoring systems of the prior art also have the disadvantage of being incapable of retrofit into existing elevator installations. As such there is a need for an accurate device to monitor and determine brake drag which eliminates or reduces the problems of the prior art.

DISCLOSURE OF THE INVENTION

Therefore, it is an object of the present invention to provide a method and apparatus for thermally detecting elevator brake drag. It is a further object of the present invention to provide sensors and a monitoring circuit to produce output signals corresponding to brake drag conditions.

In accordance with the present invention, brake drag is detected by sensing a temperature increase in a brake arm generated by friction produced between a brake drum and a brake lining. The device continuously monitors temperatures of the brake arm at several locations, compares them to an ambient temperature and produces an output signal corresponding to an out of limit condition. The output signal is conveyed to an elevator control circuit capable of dictating appropriate precautionary action for the subsequent movement of the elevator.

The foregoing and other objects, features and advantages of the present invention will become more apparent in light of the following detailed description of the invention, as shown in the accompanying drawings.

BEST MODE FOR CARRYING OUT THE INVENTION

Figure 1:
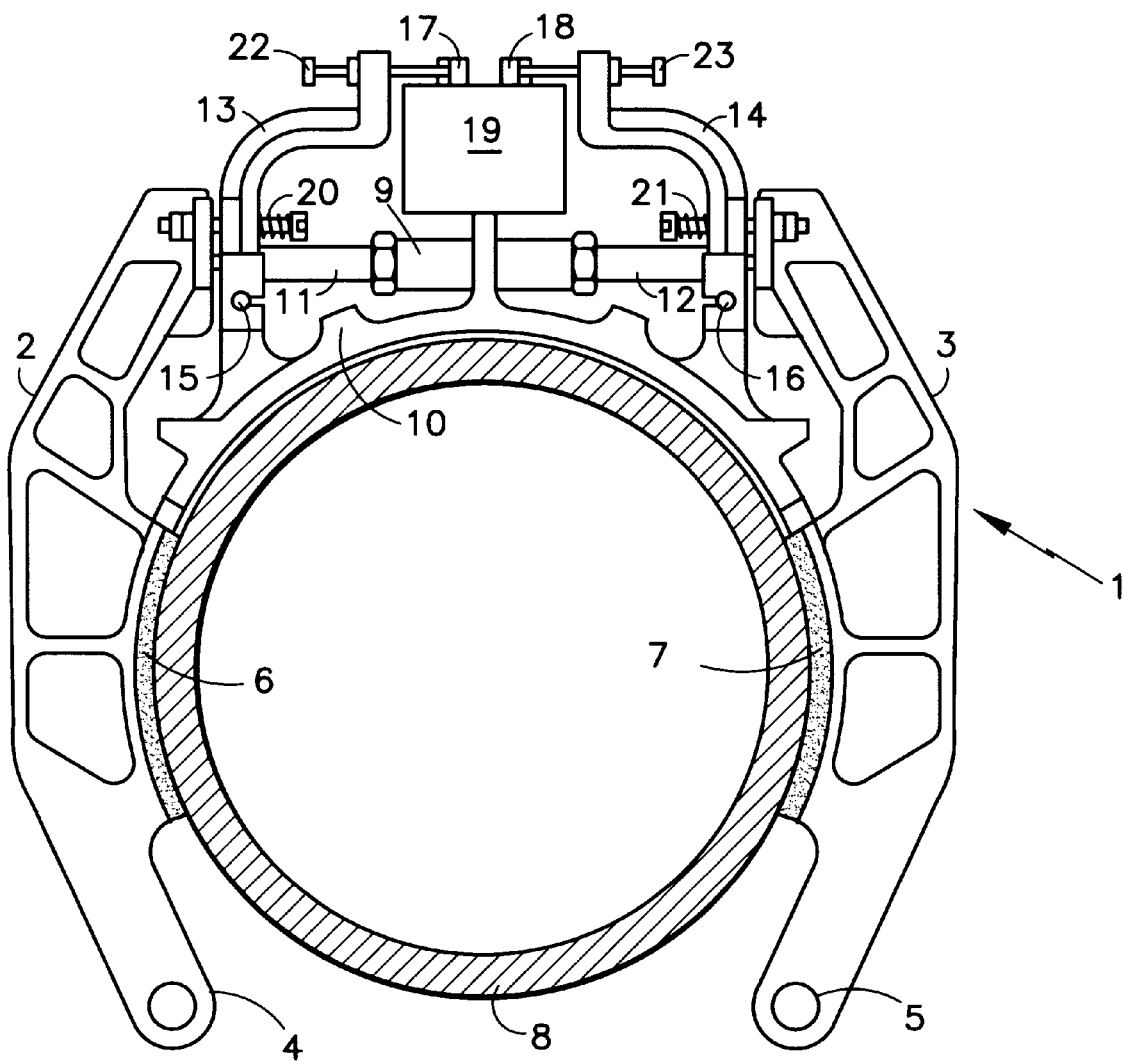
FIG. 1 is a plan view of an electromagnetic brake utilized in the prior art.
Figure 2:
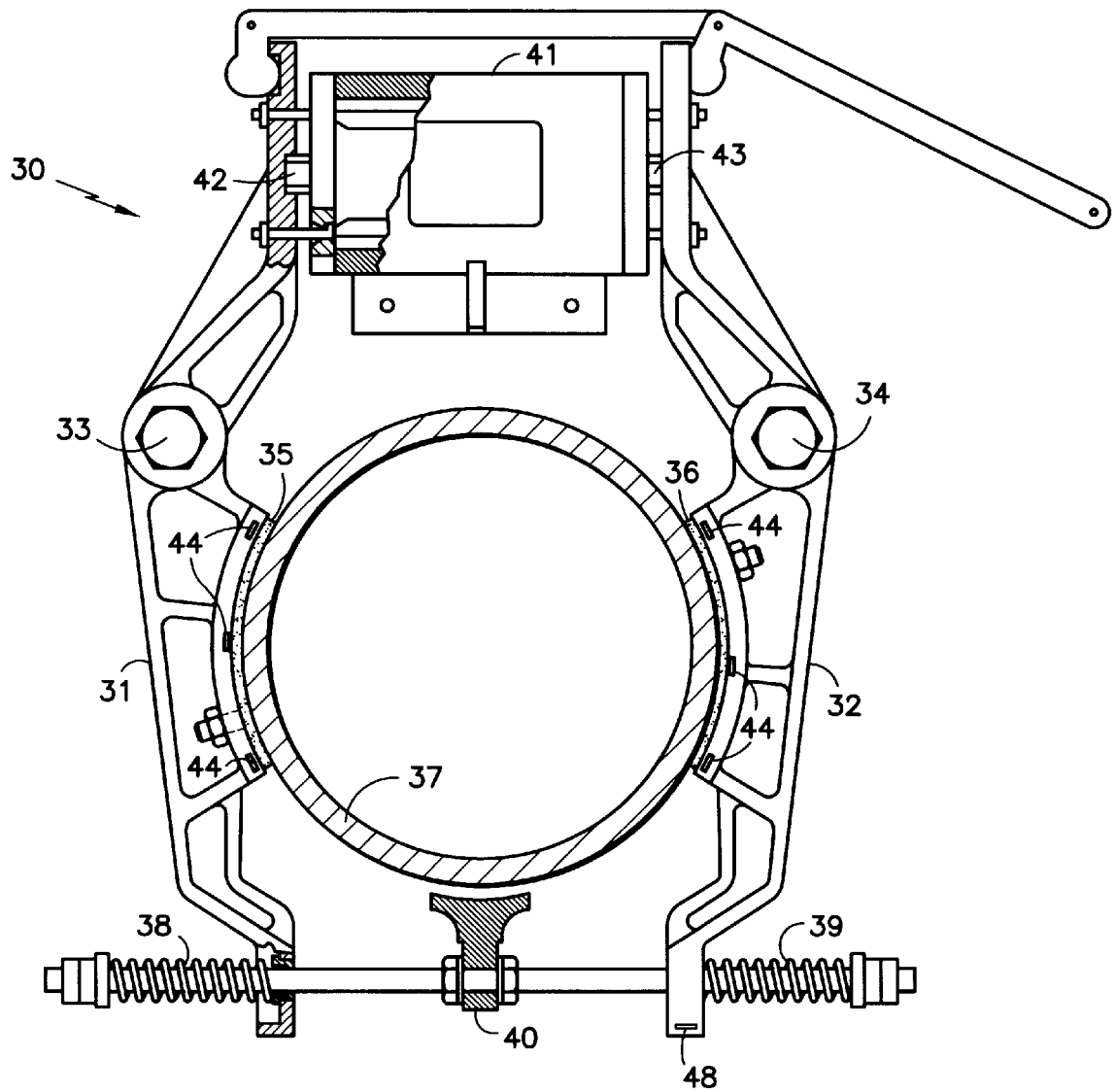
FIG. 2 is a plan view of an electromagnetic brake employing the thermal detection system of the present invention.
Figure 3:
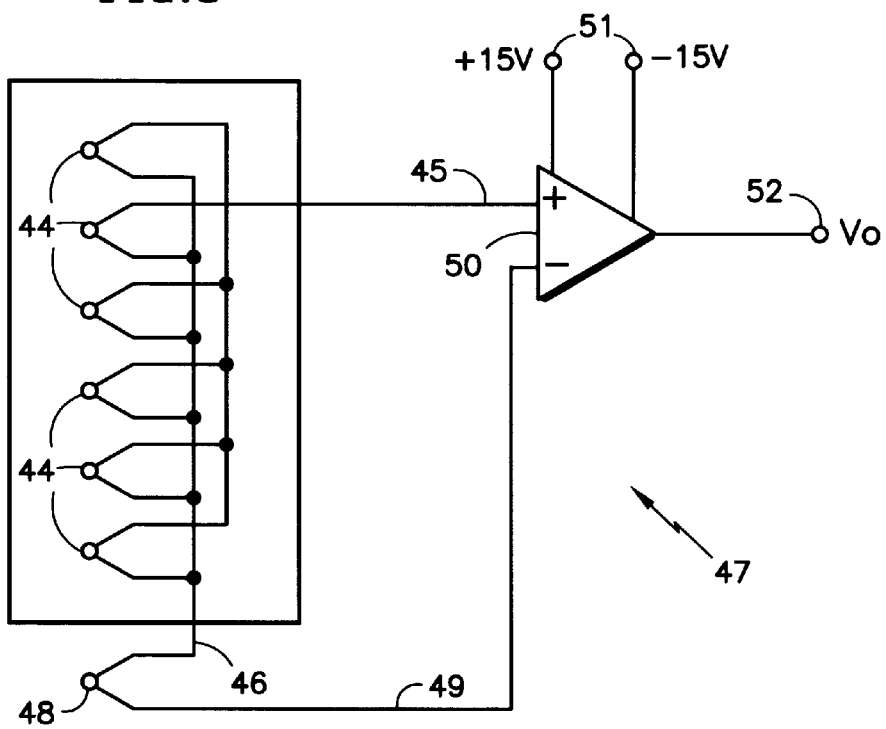
FIG. 3 is a schematic circuit diagram of the thermal detection monitoring system according to the present invention.

Referring to FIG. 2 an electromagnetic brake in accordance with the present invention is shown generally at 30. Electromagnetic brake 30 has a pair of brake pads 35, 36 attached to arms 31, 32 and biased into contact with brake drum 37 by a pair of springs 38, 39 to produce sufficient frictional force to hold an elevator car (not shown). Electromagnetic brake coil 41 is mounted to brake frame 40 and has a pair of actuation rods 42, 43 connected to either end of the coil and to brake arms 31, 32. In operation when coil 41 is energized actuation rods 42, 43 are forced inwardly towards the coil and rotate the brake arms about centers 33, 34, overcoming the biasing force of springs 38, 39 and causing the brake pads 35, 36 to be lifted away from drum 37 and thereby releasing the elevator car. Disposed on the brake arms 31, 32 are a plurality of sensing thermocouples 44 connected by wires 45, 46 to a comparator circuit 47 as shown in FIG. 3. As is well known in the art thermocouples in general are comprised of dissimilar metals which produce a voltage proportional to a temperature within a given range. In the preferred embodiment shown three (3) thermocouples are disposed on each brake arm 31 32 in close proximity to brake pads 35, 36 and provide a voltage corresponding to a temperature similar to that of the brake pads. Also mounted to brake arm 32 is a control thermocouple 48 disposed at a location distal to the brake pads producing a voltage corresponding to an ambient temperature and connected to comparator circuit 47 by wires 46, 49. The thermocouples 44, 48 are of a commercial type, such as type "T" available from Omega Manufacturing Company comprised of a copper lead and a constantan lead and can advantageously be bonded to the brake arm by a suitable adhesive as is well known in the art.

In operation brake drum 37 rotates whenever the elevator car (not shown) is moving. If brake coil 41 fails to lift brake pads 35, 36 from the drum the brake pads will drag along the surface of the drum and produce a temperature increase in the brake pads which will be sensed by thermocouples 44.

Referring now to FIG. 3, one lead of thermocouples 44 are connected together to wire 45 and in turn electrically connected to operation amplifier 50. The output from thermocouples 44 will be in the millivolt range and will be proportional to the highest junction temperature of the six individual thermocouples and will be input to operational amplifier 50. The other lead of thermocouples 44 are connected to one lead of thermocouple 48 via wire 46. The other lead of thermocouple 48 is electrically connected to operational amplifier 50 via wire 49 and provides an input voltage to operational amplifier 50 in the millivolt range corresponding to the ambient temperature. Comparator circuit 47 further includes a supply voltage represented by 51 which is input to operational amplifier 50. The operational amplifier 50 compares the input voltage from thermocouples 44 and thermocouple 48 against a predetermined threshold. The operational amplifier is selected such that the output voltage represented by 52, provided by the supply voltage 51, has an off voltage, in this case —14 volts, and an on voltage, +14 volts in this case. In operation the off voltage is present as output voltage 52 until a pre-selected input voltage differential, representing a temperature difference threshold, between thermocouples 44 and thermocouple 48 is reached. Once the threshold differential is reached on voltage is provided as output volt age 52. In the embodiment shown the operational amplifier threshold level corresponds to a 5 degree Celsius temperature difference between control thermocouple 48 and the highest of thermocouples 44. It is important to note that wires 45 and 49 are comprised of copper material and wire 46 is comprised of Constantan material. The use of copper wire connected to the copper leads of the thermocouples and Constantan wires connected to the Constantan leads of the thermocouples simplifies circuit 47 by eliminating the need for a compensatory circuit to make allowance for voltages produced by dissimilar metals.

Figure 4:
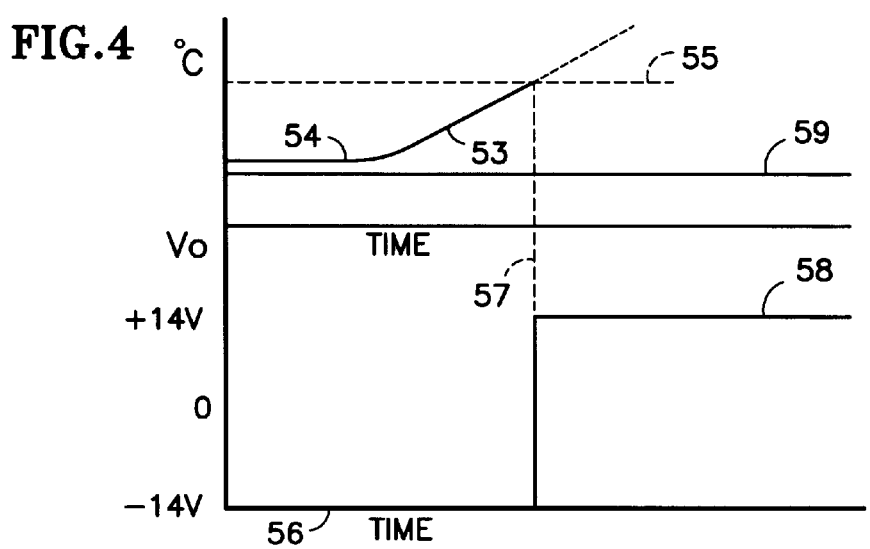
FIG. 4 is a graphical representation of a sensing signal and an output signal the thermal detection monitoring system of the present invention.

Referring now to the upper portion of FIG. 4 there is shown a graphical representation of an increase in the temperature between an ambient temperature, as sensed by thermocouple 48, represented by line 59 and the brake pad temperature, as sensed by thermocouples 44, represented by line 53. The point indicated by 54 represents the point at which the brakes begin to drag on rotating drum 37 and the sensed temperature of at least one of thermocouples 44 begins to rise. The thermocouples continuously provide a voltage signal to operational amplifier 50 proportional to a temperature. As represented in the upper portion of FIG. 4 when the brake pads drag on the drum the temperature continues to rise and when a threshold limit represented by line 55 is reached, the operational amplifier is switched on as shown in the lower portion of FIG. 4. Output voltage 52 from operational amplifier 50 is maintained, for example, at −14 volts represented by line 56 until the threshold limit is reached as represented by line 57. When the threshold limit is reached the operational amplifier is switched on and output voltage 52 is maintained at +14 volts as represented by line 58. The comparator circuit 47 is connected to a motion control circuit (not shown) such that when the differential input voltage corresponds to the threshold limit of 5 degree Celsius in this particular embodiment, a +14 volts is supplied to the motion control circuitry to enable the elevator control system to perform an orderly shutdown at a floor and open the doors to evacuate passengers.

In operation, an embodiment of the present invention has demonstrated a high degree of repeatability and accuracy at detecting brake drag events. A brake drag considered to be slight produces a 5 degree Celsius temperature increase as sensed by thermocouples 44 over the ambient temperature sensed by thermocouple 48 within a 200 foot to 300 foot elevator run. In addition the present invention has demonstrated a high tolerance to large ambient temperature swings and emergency stop conditions. For example, the elevator machine brake is normally used to hold the elevator and to provide for emergency braking, both events which heat up the machine brake but should not cause a brake drag signal due to excessive heat up. An embodiment of the present invention was tested and even after 5 emergency stops performed in a row the threshold limit was not exceeded.

As illustrated by the preferred embodiments described herein an apparatus and method capable of detecting an elevator machine brake drag is presented which is retrofitable to most new and existing elevator installations; which is disposed external to the brake pads and therefor does not compromise brake pad integrity; which detects drag after it actually occurs thereby reducing the possibility of false detection signals; which provides for a relatively simple comparator circuit; and which has no moving parts which thereby reduces maintenance and adjustment. It is also important to note that although the present invention has been described with referenced to drum type elevator machine brakes it is contemplated that the present invention is equally suitable for disc brake and other similar equivalents.

While preferred embodiments have been shown and described, various modifications and substitutions may be made thereto without departing from the spirit and scope of the invention. Accordingly, it is to be understood that the present invention has been described by way of illustrations and not limitation.

We claim:

1. Apparatus for detecting brake drag in an elevator machine brake, comprising:
   a first thermal sensor disposed proximate a brake pad on an arm for detecting a brake pad temperature;
   a second thermal sensor disposed on said arm distally to the brake pad for detecting an ambient arm temperature;

a comparator circuit for (a) comparing a difference between said brake pad temperature and said ambient arm temperature to a predetermined threshold temperature; (b) for providing a first output signal indicating proper brake condition when said difference is less than said threshold temperature: and (c) for providing a second output signal indicating that the brake is dragging when said difference is equal to or greater than said predetermined threshold temperature.

2. A method of detecting brake drag in an elevator machine brake comprising the steps of:

detecting a brake pad temperature using a first thermal sensor disposed proximate a brake pad;

detecting an ambient temperature using a second thermal sensor disposed distally to the brake pad;

comparing a difference between said brake pad temperature and said ambient temperature to a predetermined threshold temperature; and providing a first output signal when said difference is less than said threshold temperature; and providing a second output signal when said difference is equal to or greater than said predetermined threshold temperature.

* * * * *